United States Patent
Wong et al.

(10) Patent No.: US 7,557,340 B2
(45) Date of Patent: Jul. 7, 2009

(54) SHAFT-MOUNTED DETECTOR FOR OPTICAL ENCODER HAVING AN APERTURE THROUGH THE DETECTOR FOR RECEIVING A ROTARY SHAFT OF A MOTOR

(75) Inventors: Weng Fei Wong, Penang (MY); Cheng Kwong Cheang, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 68 days.

(21) Appl. No.: 11/868,508

(22) Filed: Oct. 7, 2007

(65) Prior Publication Data
US 2009/0090851 A1    Apr. 9, 2009

(51) Int. Cl.
*G01D 5/34* (2006.01)
(52) U.S. Cl. .................... 250/231.13; 250/239
(58) Field of Classification Search ............ 250/231.13, 250/231.16, 214 PR, 239, 216; 341/11, 13
See application file for complete search history.

(56) References Cited

U.S. PATENT DOCUMENTS

| | | | |
|---|---|---|---|
| 4,451,731 A | | 5/1984 | Leonard |
| 4,559,524 A | * | 12/1985 | Suzuki ................. 341/11 |
| 4,691,101 A | | 9/1987 | Leonard |
| 5,241,172 A | | 8/1993 | Lugaresi |
| 6,278,107 B1 | | 8/2001 | Gaumet |
| 6,995,356 B2 | | 2/2006 | Chong et al. |

* cited by examiner

*Primary Examiner*—Que T Le

(57) ABSTRACT

A transmissive optical encoder is disclosed. The transmissive optical encoder includes a detector, a code wheel, and an emitter. The detector includes an aperture through the detector. The aperture is configured to receive a rotary shaft of a motor. The code wheel is coupled to the rotary shaft of the motor. Rotation of the rotary shaft results in corresponding rotation of the code wheel. The emitter is configured to emit a light signal through the code wheel toward the detector. Rotation of the code wheel results in modulation of the light signal at the detector. Embodiments of the transmissive optical encoder consume relatively little space and facilitate alignment of the emitter and detector.

13 Claims, 10 Drawing Sheets

SHAFT-MOUNTED DETECTOR FOR OPTICAL ENCODER HAVING AN APERTURE THROUGH THE DETECTOR FOR RECEIVING A ROTARY SHAFT OF A MOTOR

BACKGROUND OF THE INVENTION

Optical encoders are used to monitor the motion of, for example, a rotary shaft such as a crank shaft. Optical encoders can monitor the motion of a shaft in terms of position and/or number of revolutions of the shaft. Optical encoders typically use a code wheel attached to the shaft to modulate light as the shaft and the code wheel rotate. In a transmissive code wheel, the light is modulated as it passes through transmissive sections of a track on the code wheel. The transmissive sections are separated by non-transmissive sections. In a reflective code wheel, the light is modulated as it is reflected off of reflective sections of the track on the code wheel. The reflective sections are separated by non-reflective sections. As the light is modulated in response to the rotation of the code wheel, a stream of electrical signals is generated by a photosensor array that receives the modulated light. The electrical signals are used, for example, to determine the position and/or number of revolutions of the shaft.

FIG. 1 illustrates a conventional transmissive optical encoder system 10. The optical encoder system 10 includes an encoder 12 and a transmissive code wheel 14. The code wheel 14 is coupled to a rotary shaft 16 of a motor 18. The encoder 12 includes a light source 20, a collimating lens 22, and a detector 24. Together, the light source 20 and the collimating lens 22 also may be referred to as an emitter. The light source 20 emits light, which is collimated by the collimating lens 22 and is modulated as it passes through the transmissive sections of the code wheel 14. The detector 24 includes a photosensor array such as an array a photodiodes which detects the modulated light. Typically, the photosensor array has a resolution that is equal to the resolution of the coding element.

One disadvantage of conventional transmissive optical encoders, compared to conventional reflective optical encoders, is that the placement of the emitter 20 and the detector 24 on opposite sides of the code wheel 14 consumes more space, making the conventional transmissive optical encoder 12 relatively large. Also, misalignment of the emitter 20 and/or the detector 24 with the code wheel 14 or with each other degrades the performance of conventional transmissive optical encoders 12

SUMMARY OF THE INVENTION

Embodiments of a transmissive optical encoder are described. In one embodiment, the transmissive optical encoder includes a detector, a code wheel, and an emitter. The detector includes an aperture through the detector. The aperture is configured to receive a rotary shaft of a motor. The code wheel is coupled to the rotary shaft of the motor. Rotation of the rotary shaft results in corresponding rotation of the code wheel. The emitter is configured to emit a light signal through the code wheel toward the detector. Rotation of the code wheel results in modulation of the light signal at the detector. Embodiments of the transmissive optical encoder consume relatively little space and facilitate alignment of the emitter and detector. Other embodiments of the transmissive optical encoder are also described.

Embodiments of a detector of a transmissive optical encoder are also described. In one embodiment, the detector includes a substrate and a photosensor array. The substrate includes an aperture through the substrate. The aperture is configured to receive a rotary shaft of a motor. The photosensor array is coupled to the substrate. The photosensor array is located on the substrate at a position to receive a modulated light signal from an emitter through a coding element coupled to the rotary shaft. Other embodiments of the detector are also described.

Embodiments of a method are also described. In one embodiment, the method is a method for method for assembling transmissive optical encoder system. The method includes mounting a detector comprising a photosensor array on a rotary shaft of a motor. The rotary motor shaft projects through an aperture in the detector. The method also includes mounting a coding element to the rotary shaft to modulate a light signal upon rotation of the rotary shaft. The method also includes mounting an emitter relative to the coding element to generate the light signal and to direct the light signal toward the coding element. The detector is located to detect the modulated light signal. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
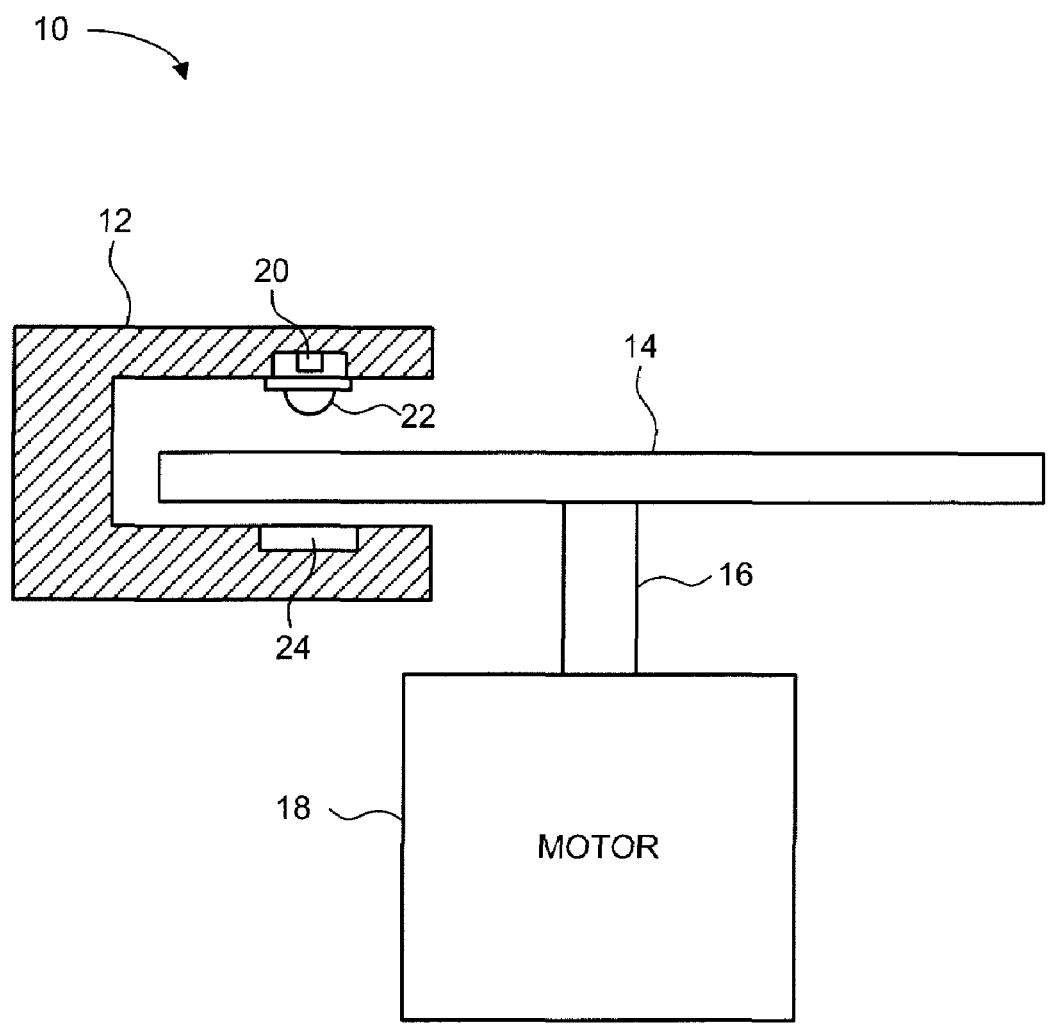
FIG. 1 illustrates a conventional transmissive optical encoder system.
Figure 2:
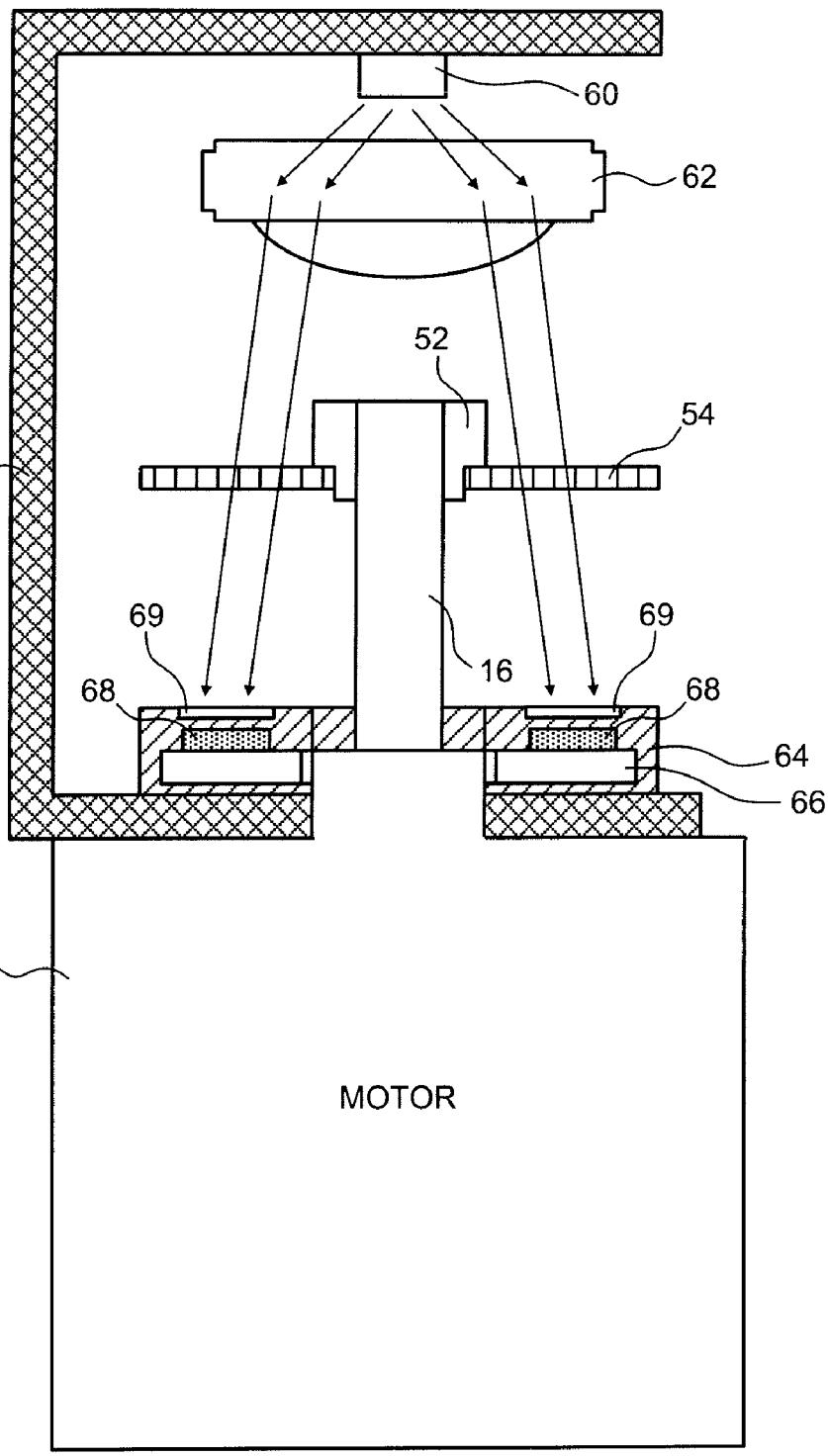
FIG. 2 depicts a schematic block diagram of one embodiment of a transmissive optical encoding system mounted directly on a shaft of a motor.

FIG. 2 depicts a schematic block diagram of one embodiment of a transmissive optical encoding system 50 mounted directly on a shaft 16 of a motor 18. The illustrated transmissive optical encoding system 50 includes a code wheel mounting device 52 to mount a code wheel 54 to the shaft 16 of the motor 18. Any type of conventional code wheel mounting device 52 may be used. In some embodiments, the code wheel 54 may be any type of conventional transmissive code wheel 54. Some exemplary code wheels 54 are describe in U.S. Pat. Nos. 4,451,731, 4,691,101, and 5,241,172, which are incorporated by reference herein. Other code wheels 54 also may be used. At least one embodiment of a code wheel 54 is described in more detail below, referring to FIG. 8.

The illustrated transmissive optical encoding system 50 also includes a flexible circuit 56. An emitter 60 is mounted to the flexible circuit 56 at a location that allows the emitter 60 to emit a light signal (shown as arrows) toward the motor 18 through the code wheel 54. Other embodiments may use a rigid circuit or other connection in place of the flexible circuit 56 shown and described herein. For example, wires may be used in place of the flexible circuit 56. Some embodiments also include a collimating lens 62 to collimate the light from the emitter 60 prior to transmission through the code wheel 54. Various types of emitters 60 and collimating lenses 62 are known.

The illustrated optical encoding system 50 also includes a detector 64. The detector 64 is mounted to the flexible circuit 56 at a location to receive the light signal from the emitter 60, after the light signal passes through the code wheel 54. Exemplary embodiments of the detector 64 include integrated circuit (IC) dice and IC packages. Although various types of detectors 64 may be used, the depicted detector 64 includes a substrate 66 and a photosensor array 68. Some embodiments of the detector 64 also include a package to enclose, or house, the substrate 66 and the photosensor array 68. In one embodiment, the photosensor array 68 is circular so that it circumscribes the shaft 16 of the motor 18. One example of a circular photosensor array 68 is shown in FIG. 3B and described in more detail below. Other embodiments of photosensor arrays also may be implemented.

In order for the light to reach the photosensor array 68 within the package, the detector 64 may include a substantially transmissive window 69 that is aligned with the photosensor array 68. For example, if a circular photosensor array 68 is implemented, then the window may be circular 69 to substantially correspond to the circular photosensor array 68. In this way, the photosensor array 68 is able to receive the light from the emitter 60 that transmits through the code wheel 54. In an alternative embodiment, the package may include a cutaway window, instead of the transmissive window 69, so that there is no structure to impede or otherwise modify the path of the light signal from the code wheel 54. In another embodiment, the photosensor array 68 may be approximately flush with the package at the incident surface of the detector 64. In another embodiment, the photosensor array 68 may extend out of the package of the detector 64. In another embodiment, the detector 64 may be implemented without a package, so there is no need for a transmissive window 69 or other portion to allow the light signal to be incident on the photosensor array 68.

Regardless of the type of detector technology implemented, the detector 64 includes an aperture, or hole, that extends through the detector 64. In other words, there is an aperture through the substrate 66 and, where a package is used to house the substrate 66, there is a corresponding aperture through the package. The presence of the aperture through the detector 64 allows the rotary shaft 16 of the motor 18 to extend through the detector 64. In other words, the detector 64 is mounted eccentric to the motor shaft 16 of the motor 18.

In one embodiment, the aperture approximately corresponds in size with the motor boss (the plastic structure that surrounds the motor shaft 16 as it protrudes from the housing of the motor 18. This embodiment maintains a separation between the shaft 16 and the detector 64 so that the shaft 16 does not create friction on the detector 64 as the shaft 16 rotates. Alternatively, the detector 64 may be mounted to the housing of the motor 18 using a centering jig to maintain the separation between the shaft 16 and the detector 64.

The size (i.e. diameter) of the aperture may vary depending on the implementation for which the detector 64 is designed. In some embodiments, the aperture may be just large enough, within a measurable tolerance, to allow the shaft 16 to extend through the detector 64. In other embodiments, the aperture may be sized, within a tolerance, to fit around a portion of the motor housing near the shaft 16. Where the aperture is sized to fit relatively closely to the shaft or the corresponding portion of the motor housing, the placement of the detector 64 on the shaft 16 may facilitate the proper alignment of the emitter 60 with the photosensor array 68 of the detector 64. Additionally, the aperture may facilitate alignment of the emitter 60 and/or the photosensor array 68 of the detector 64 with the code wheel 54. In other embodiments, the aperture may be substantially larger than the shaft 16 of the motor 18 to facilitate easy assembly of the transmissive optical encoding system 50.

It should also be noted that at least some embodiments of the transmissive optical encoding system 50 include a housing (not shown) for the optical encoder. In this way, the optical encoder may be protected from potentially harmful operating conditions such as dust, dirt, ink, or other particulate matter, depending on the application in which the optical encoder is implemented.

Figure 3A:
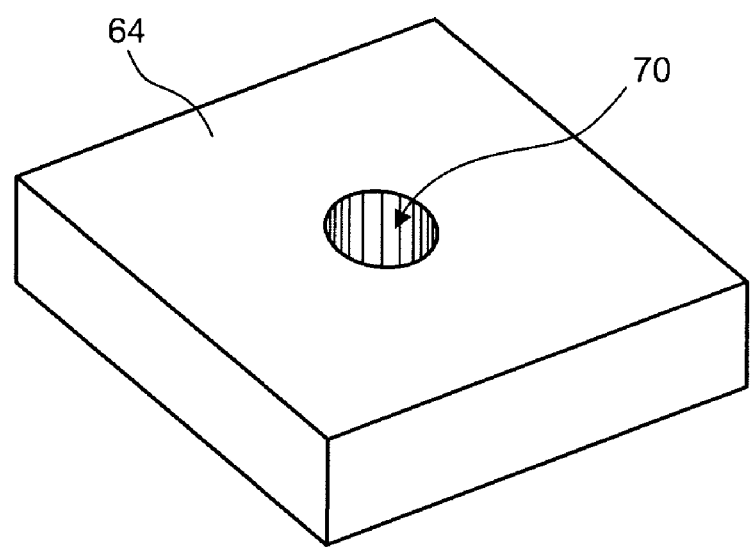
FIG. 3A depicts a schematic perspective view of one embodiment of a rectangular detector for use in the optical encoder of FIG. 2.
Figure 3B:
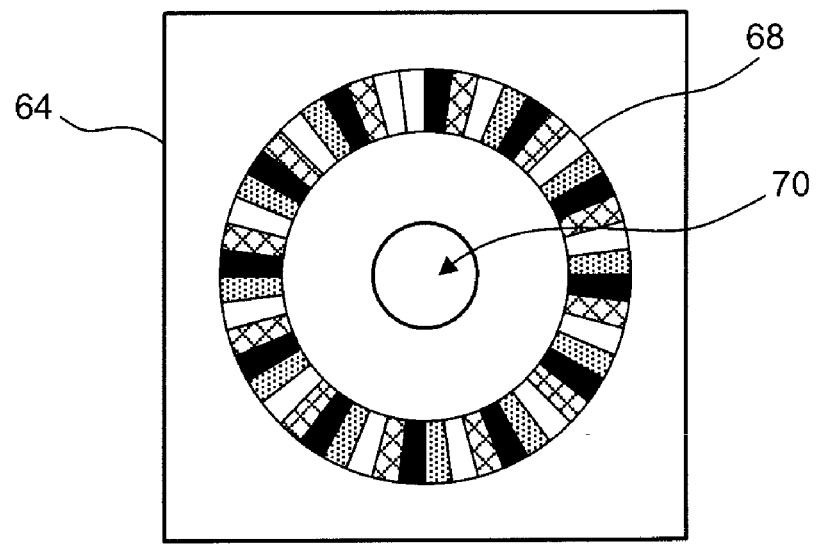
FIG. 3B depicts a schematic top view of one embodiment of a rectangular detector with a circular photosensor array which circumscribes the aperture that extends through the detector.

FIG. 3A depicts a schematic perspective view of one embodiment of a rectangular detector 64 for use in the optical encoder of FIG. 2. In particular, the package of the rectangular detector 64 is shown, and the substrate 66 and photosensor array 68 are mounted within the package. The illustrated rectangular detector 64 includes an aperture 70 that extends through the entire structure of the detector 64, including the substrate 66 and the package. Although the photosensor array 68 and the window 69 are not shown in FIG. 3A, FIG. 3B depicts a schematic top view of one embodiment of a rectangular detector 64 with a circular photosensor array 68 which circumscribes the aperture 70 that extends through the detector 64. In the depicted photosensor array 68 of FIG. 3B, the individual photodiodes are distinguished. Also, it should be noted that, although embodiments of an incremental encoder are shown and described herein, other embodiments of the transmissive optical encoder system 50 may implement other types of encoders, including an incremental encoder for multiple channels, a commutation encoder with multiple channels, a pseudo-absolute encoder, an absolute encoder, or another type of encoder. Additional details of the functionality of the photosensor array 68 are described in more detail below with reference to FIG. 9.

Although the aperture 70 is shown with a substantially circular cross-section, other embodiments of the detector 64 may have apertures with other shapes and sizes of apertures. For example, some embodiments of the detector 64 include apertures 70 with rectangular, square, triangular, or oval cross-sections. Other embodiments of the detector include apertures 70 with non-canonical shapes, for example, to conform to the shape of an extended portion of the motor housing. Additionally, other embodiments include more than one aperture, in order to accommodate multiple structures (e.g., the shaft 16) extending through the detector 64.

Figure 4:
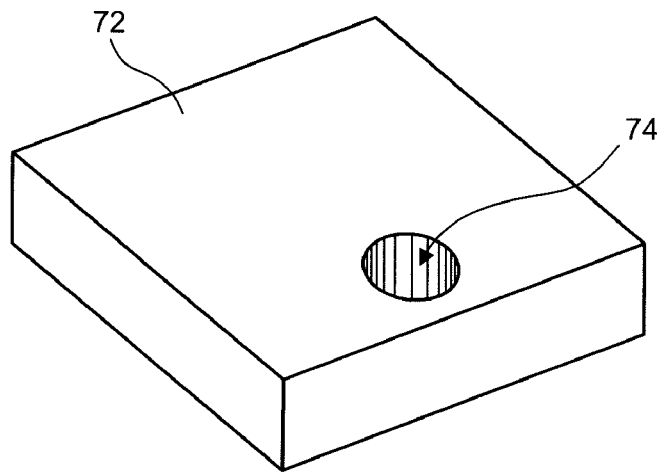
FIG. 4 depicts a schematic perspective view of another embodiment of a rectangular detector with an offset aperture for use in the optical encoder of FIG. 2.

FIG. 4 depicts a schematic perspective view of another embodiment of a rectangular detector 72 with an offset aperture 74 for use in the optical encoder of FIG. 2. Although the shape and size of the aperture 74 is substantially similar to the shape and size of the aperture 70 of the detector 64 shown in FIG. 3, the aperture 74 is offset so that it is closer to one edge of the detector 72. This embodiment may facilitate a simpler layout for the circuitry within the detector 72, compared to the detector 64 of FIG. 3.

Figure 5:
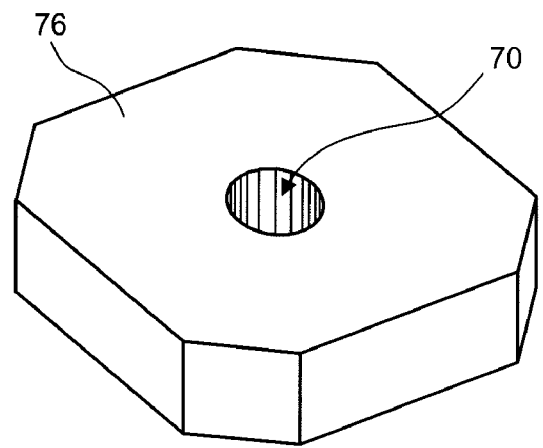
FIG. 5 depicts a schematic perspective view of another embodiment of rectangular detector with chamfered corners for use in the optical encoder of FIG. 2.

FIG. 5 depicts a schematic perspective view of another embodiment of rectangular detector 76 with chamfered corners for use in the optical encoder of FIG. 2. The corners of the rectangular detector 76 are chamfered so that the overall space consumption of the detector 76 is smaller compared to a rectangular detector of the same size without chamfered corners. Embodiments with chamfered corners may conform better to cylindrical housings of certain motors.

Figure 6:
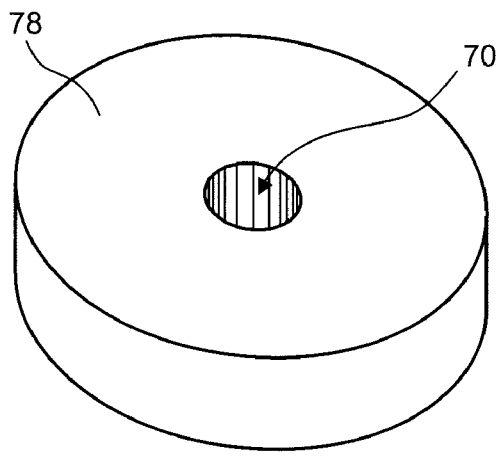
FIG. 6 depicts a schematic perspective view of one embodiment of a circular detector for use in the optical encoder of FIG. 2.

FIG. 6 depicts a schematic perspective view of one embodiment of a circular detector 78 for use in the optical encoder of FIG. 2. In particular, the circular detector 78 has a cylindrical shape. Like the rectangular detector 76 with chamfered corners, the circular detector 78 may conform better to cylindrical housings of certain motors. Using different shapes for different implementations may provide increased detector area in the relatively small application areas. In other words, different shapes of detectors allow the optical encoder to fit into small form factor implementations.

Figure 7:
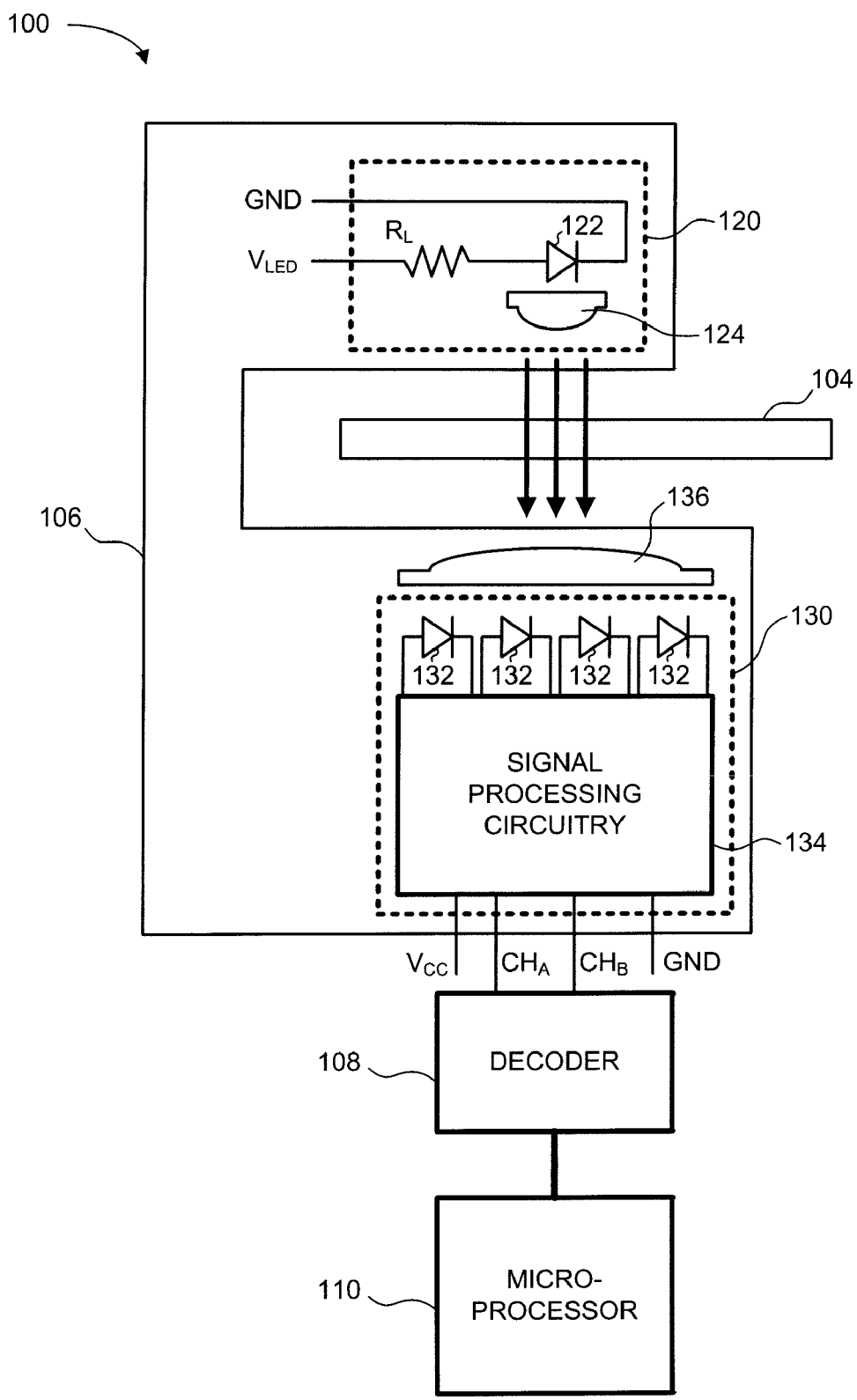
FIG. 7 depicts a schematic circuit diagram of one embodiment of an optical encoder for use in the transmissive optical encoder system of FIG. 2.

FIG. 7 depicts a schematic circuit diagram of one embodiment of an optical encoder 100 for use in the transmissive optical encoder system 50 of FIG. 2. The illustrated transmissive optical encoding system 100 includes a code wheel 104, an encoder 106, a decoder 108, and a microprocessor 110. The code wheel 104 is substantially similar to the code wheel 54 of FIG. 2. Although a more detailed illustration of the code wheel 104 is provided below with reference to FIG. 8, a brief explanation is provided here as context for the operation of the transmissive optical encoding system 100 shown in FIG. 7.

In general, the code wheel 104 includes a track 140 of transmissive sections 142 and non-transmissive sections 144. An emitter 120 in the encoder 106 produces light (i.e., a light signal) that is incident on the code wheel track 140. As the code wheel 104 is rotated, for example by a motor shaft 16, the incident light is transmitted through the code wheel 104 by the transmissive sections 142 of the track 140, but is not transmitted by the non-transmissive sections 144 of the track 140. Thus, the light is transmitted through the track 140 in a modulated pattern (i.e., on-off-on-off . . . ). A detector 130 in the encoder 106 detects the modulated light signal and, in response, generates one or more periodic channel signals (e.g., $CH_A$ and $CH_B$). In one embodiment, these channel signals are then transmitted to the decoder 108, which generates a count signal and transmits the count signal to the microprocessor 110. The microprocessor 110 uses the count signal to evaluate the movement of, for example, the motor shaft 16 or other moving part to which the code wheel 104 is coupled. Other embodiments may implement other types of code wheels 104, such as multi-track and absolute position code wheels, as are known in the art.

In one embodiment, the encoder 106 includes the emitter 120 and the detector 130. The emitter 120 includes a light source 122 such as a light-emitting diode (LED). For convenience, the light source 122 is described herein as an LED, although other light sources, or multiple light sources, may be implemented. In one embodiment, the LED 122 is driven by a driver signal, $V_{LED}$, through a current-limiting resistor, $R_L$. The details of such driver circuits are well-known. Some embodiments of the emitter 120 also may include a collimating lens 124 (substantially similar to the collimating lens 62 of FIG. 2) aligned with the LED 122 to direct the projected light in a particular path or pattern. For example, the collimating lens 124 may direct approximately parallel rays of light onto the code wheel track 140.

In one embodiment, the detector 130 includes one or more photosensors 132 such as photodiodes. The photosensors 132 may be implemented, for example, in an integrated circuit (IC). For convenience, the photosensors 132 are described herein as photodiodes, although other types of photosensors 132 may be implemented. In one embodiment, the photodiodes 132 are uniquely configured to detect a specific pattern or wavelength of transmitted light. In some embodiments, several photodiodes 132 may be used to detect modulated light signals from multiple tracks 140, including positional tracks and index tracks, or a combined position and index track. Also, the photodiodes 132 may be arranged in a pattern that corresponds to the radius and design of the code wheel 104. The various patterns of photodiodes 132 are referred to herein as a photosensor array.

The electrical signals produced by the photodiodes 132 are processed by signal processing circuitry 134 which generates the channel signals, $CH_A$ and $CH_B$. The signal processing circuitry 134 also may generate other signals, including other channel signals, complementary channel signals, or an indexing signal, which may be used to determine the rotational position or the number of rotations of the code wheel 104.

In one embodiment, the detector 130 also includes one or more comparators (not shown) to facilitate generation of the channel signals. For example, analog signals (and their complements) from the photodiodes 132 may be converted by the comparators to transistor-transistor logic (TTL) compatible, digital output signals. In one embodiment, these output channel signals may indicate count and direction information for the modulated light signal.

Additionally, the encoder 106 may include a detector lens 136 to direct the modulated light signal toward the photodiodes 132. In one embodiment, the detector lens 136 is mounted in front of the detector 130 for better light extraction and to ensure sufficient power delivery onto the detector 130. Various embodiments of the detector lens 136 may be implemented, as described below.

Additional details of emitters, detectors, and optical encoders, generally, may be referenced in U.S. Pat. Nos. 4,451,731, 4,691,101, and 5,241,172, which are incorporated by reference herein.

Figure 8:
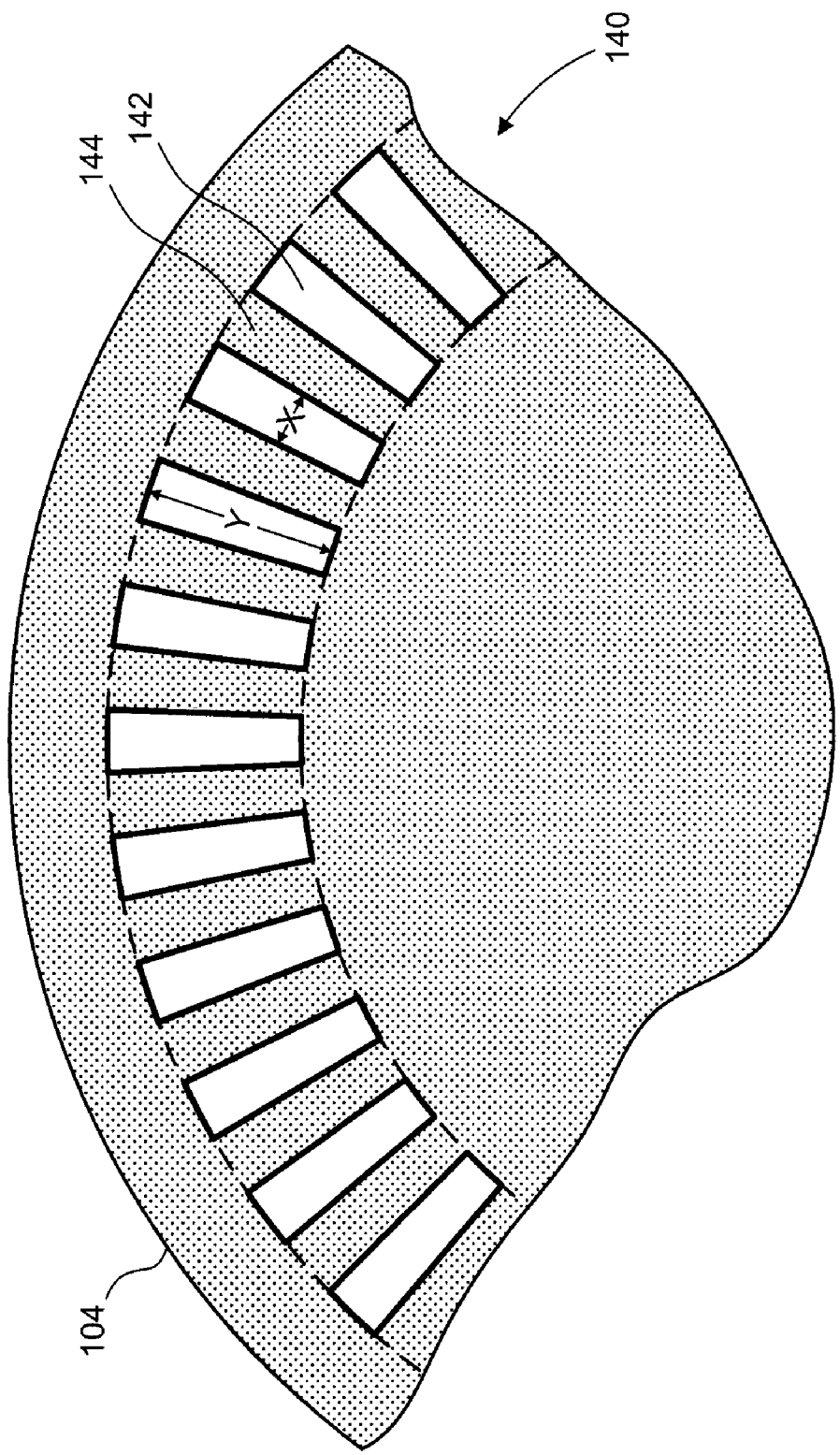
FIG. 8 depicts a partial schematic diagram of one embodiment of a code wheel.

FIG. 8 depicts a partial schematic diagram of one embodiment of a code wheel 104. In particular, FIG. 8 illustrates a portion of a circular code wheel 104 in the shape of a disc. In some embodiments, the code wheel 104 may be in the shape of a ring, rather than a disc. The illustrated code wheel 104 includes a track 140, which may be a circular track that is concentric with the code wheel 104. In one embodiment, the track 140 includes a continuous repeating pattern that goes all the way around the code wheel 104. The depicted pattern includes alternating transmissive sections 142 and non-transmissive sections 144, although other patterns may be implemented. In one embodiment, the transmissive sections 142 are transparent sections of the code wheel 104 or, alternatively, voids (e.g., holes) in the code wheel 104. The non-transmissive sections 144 are, for example, opaque sections in the code wheel 104 or, alternatively, reflective sections in the code wheel 104. In one embodiment, the surface areas corresponding to the non-transmissive sections 144 are coated with an absorptive material.

In another embodiment, a circular coding element 104 may be implemented with a spiral bar pattern, as described in U.S. Pat. No. 5,017,776, which is incorporated by reference herein. Alternatively, other light modulation patterns may be implemented on various shapes of coding elements.

As described above, rotation of the code wheel 104 and, hence, the track 140 results in modulation of the transmitted light signal at the detector 130 to measure positional changes of the code wheel 104. Other embodiments of the code wheel 104 may include other tracks such as additional positional tracks or an index track, as are known in the art.

In the depicted embodiment, the transmissive and non-transmissive track sections 142 and 144 have the same circumferential dimensions (also referred to as the width dimension). In other words, the intermediate non-transmissive track sections 144 have the same width dimension as the transmissive track sections 142. The resolution of the code wheel 104 is a function of the width dimensions (as indicated by the span "x") of the track sections 140 and 142. In one embodiment, the width dimensions of the non-transmissive track sections 144 are a function of the amount of area required to produce a detectable gap between consecutive, transmitted light pulses. The radial, or height, dimensions (as indicated by the span "y") of the transmissive and non-transmissive track sections 140 and 142 are a function of the amount of area required to generate a sufficient amount of photocurrent (e.g., the more photocurrent that is required, the larger the area required and hence the larger "y" needs to be since area equals "x" times "y"). Typically, the "y" dimension is made substantially larger than the height of the photodiodes 132.

Figure 9:
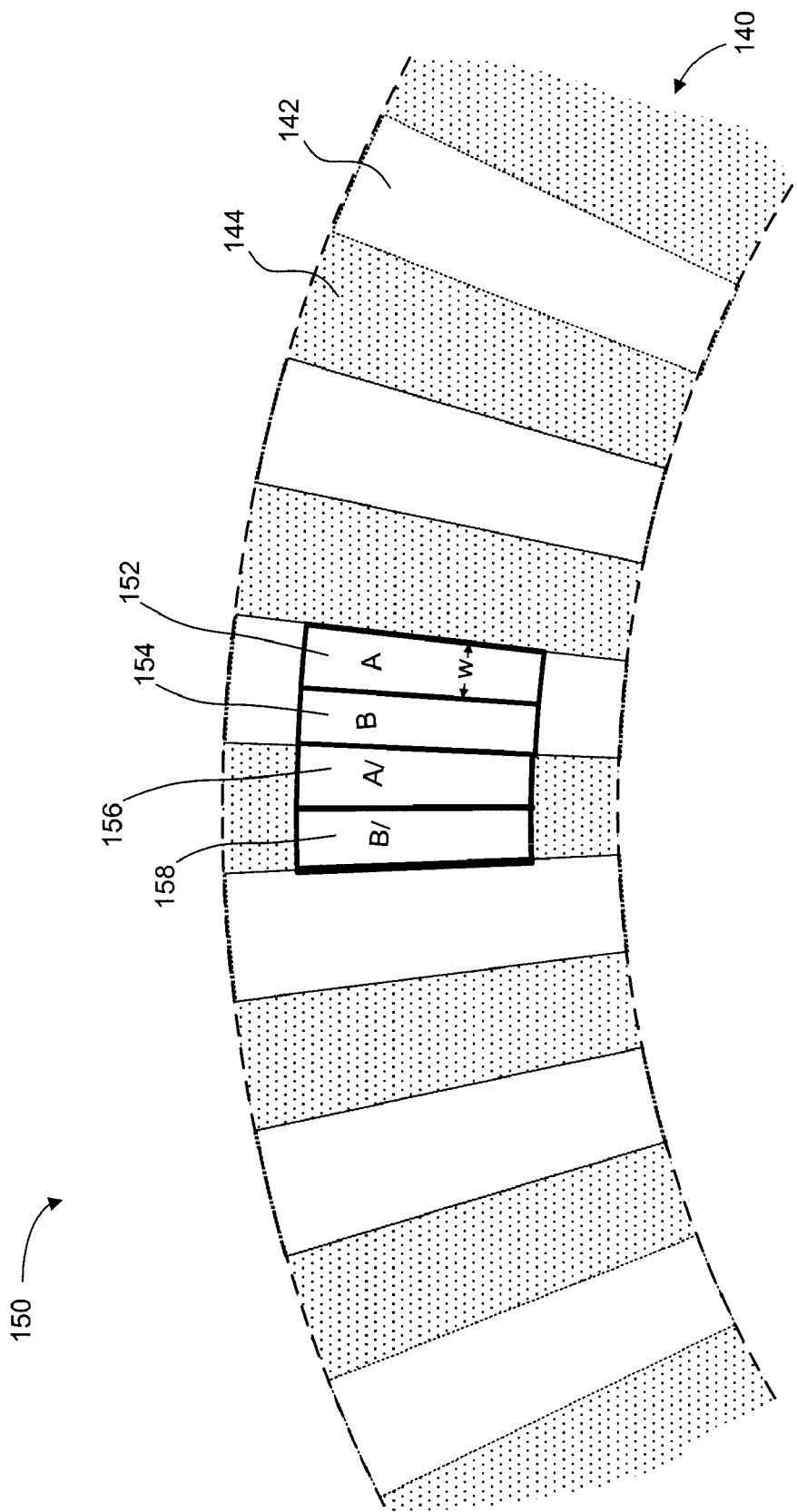
FIG. 9 depicts a schematic layout of one embodiment of a photosensor array relative to the code wheel track.

FIG. 9 depicts a schematic layout of one embodiment of a photosensor array 150 relative to the code wheel track 140. The photosensor array 150 is also referred to as a photodiode array. A representation of the code wheel track 140 is overlaid with the photosensor array 150 to depict exemplary dimensions of the individual photosensor array elements (i.e., photodiodes 132) with respect to the sections of the code wheel track 140. Although the photodiode array 150 corresponds to a circular code wheel track 140, other embodiments may implement a photosensor array 150 arranged to align with a linear track of a linear code strip.

The illustrated photodiode array 150 includes several individual photodiodes, including an A-signal photodiode 152 to generate an A signal, a B-signal photodiode 154 to generate a B signal, an A/-signal photodiode 156 to generate an A/signal, and a B/-signal photodiode 158 to generate a B/signal. For clarification, "A/" is read as "A bar" and "B/" is read as "B bar." This designation of the position photodiodes 152, 154, 156, and 158 and the corresponding electrical signals that are generated by the position photodiodes 152, 154, 156, and 158 is well-known in the art. The circumferential dimensions (also referred to as the width dimensions, indicated by the span "w") of the position photodiodes 152, 154, 156, and 158 are related to the width dimensions of the position track sections 142 and 144 of the corresponding code wheel track 140. In the embodiment of FIG. 9, each position photodiode 152, 154, 156, and 158 has a width that is one half the width of the transmissive and non-transmissive track sections 142 and 144 of the corresponding position track 140 (i.e., "w" equals "x/2"). Other embodiments of the photosensor array 150 may include other photosensors 132, as are known in the art.

Figure 10:
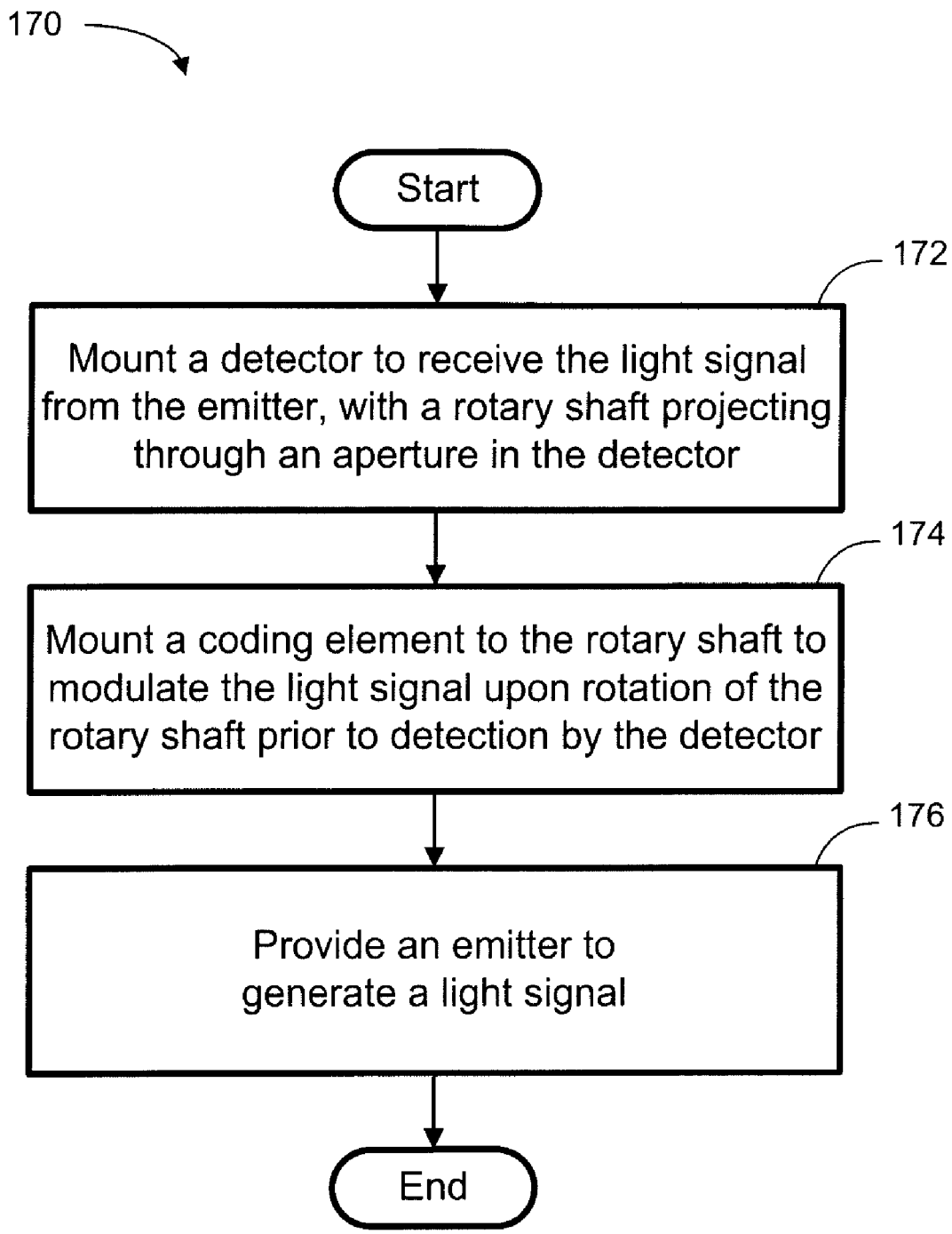
FIG. 10 depicts a schematic flow chart diagram of one embodiment of a method for assembling the transmissive optical encoder system of FIG. 2.

FIG. 10 depicts a schematic flow chart diagram of one embodiment of a method 170 for assembling the transmissive optical encoder system 50 of FIG. 2. Although specific reference is made to the transmissive optical encoding system 50 of FIG. 2, some embodiments of the method 170 may be implemented in conjunction with other optical encoding systems.

At block 172, a detector 64 is mounted to a motor shaft 16. As explained above, the detector 64 includes an aperture for a rotary shaft 16 to extend through the aperture of the detector 64. The detector 64 is also mounted to receive light from an emitter 60, which may be mounted after the detector 64 is mounted to the motor shaft 16. At block 174, a coding element such as a code wheel 54 (or the code wheel 104) is mounted to the rotary shaft 16. Upon rotation of the rotary shaft 16, the code wheel 54 rotates and, hence, modulates the light signal incident at the detector 64. In this way, the detector 64 detects the modulated light signal from the emitter 60 through the code wheel 54 during operation of the transmissive optical encoder system 50.

At block 176, an emitter 60 is provided. The emitter 60 is configured to generate a light signal. One example of an emitter 60 is a LED, which may be coupled to a collimating lens 62, although other types of light sources may be implemented. In one embodiment, the emitter 60 is mounting to a housing or other structure to hold the emitter 60. The depicted method 170 then ends.

Although the operations of the illustrated method 170 are shown and described in a particular, it should be noted that some embodiments of the method 170 implement the operations in another order. For example, some embodiments may implement multiple operations at substantially the same time, for example, by mounting a pre-assemble circuit to the motor shaft 16.

Figure 11:
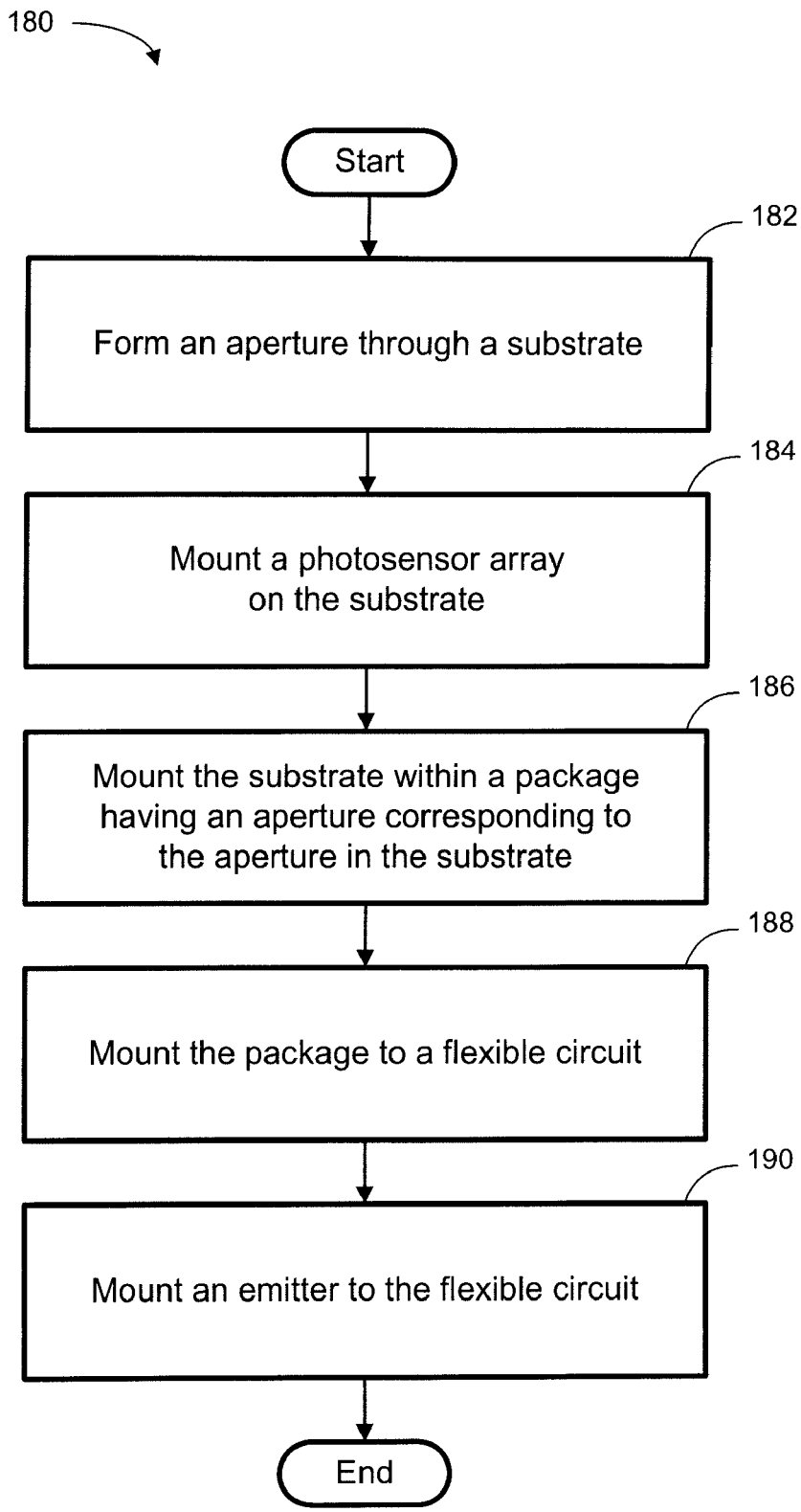
FIG. 11 depicts a schematic flow chart diagram of one embodiment of a method for making a detector for the optical encoder of FIG. 2.

FIG. 11 depicts a schematic flow chart diagram of one embodiment of a method 180 for making a detector 64 for the optical encoder of FIG. 2. Although specific reference is made to the optical encoder of FIG. 2, some embodiments of the method 180 may be implemented in conjunction with other optical encoders.

At block 182, an aperture is formed through a substrate 66. At block 184, the photosensor array 68 is mounted on the substrate 66. As used herein, the term mounting may refer to joining two structures, but is not necessary limited to joining or coupling separate structures together. Mounting also may include fabricating one structure from another structure. In one embodiment, the aperture and the photosensor array 68 are formed in the substrate 66 during wafer fabrication for an IC or IC package. By forming the aperture during wafer fabrication, the location of the photosensor array 68 relative to the aperture can be precisely dimensioned and positioned on the substrate 66. Hence, direct mounting such a substrate 66 to the rotary shaft 16 can reduce tolerance stack-up. Since radial and tangential mismatch can affect the performance of the detector 64 in a small optical radius system, precise alignment of the photosensor array 68 relative to the rotary shaft 16 and, hence, the code wheel 54 is beneficial. Such precise positioning also may enable increased encoder resolution because the photodiode tracks may be packed closely together.

At block 186, the substrate 66 is mounted within a package. The package has an aperture corresponding to the aperture in the substrate 66. Thus, the apertures of the substrate 66 and the package align to allow the rotary shaft 16 to extend through the detector 64. It should be noted, however, that some embodiments of the detector 64 may be implemented without the use of a separate detector package. In fact, the detector 64 may be implemented using a variety of technology. An exemplary implementation for the detector 64 includes, but is not limited to, IC dice with normal wire bonding & encapsulation to protect the wire bonds. Another exemplary implementation for the detector 64 includes a flip chip with underfill to protect the ball bond. Another exemplary implementation for the detector 64 includes a chip-scale-package (CSP) or any other IC packaging. Other types of detectors also may be implemented.

At block 188, the package is mounted to a flexible circuit 56. At block 190, an emitter 60 is also mounted to the flexible circuit 56. In one embodiment, the emitter 60 is mounted to the flexible circuit 56 in a position to direct a light signal from the emitter 60 toward the photosensor array 66 of the detector 64. Alternatively, the flexible circuit 56 may be arranged in another manner to direct the light signal from the emitter 60 toward the photosensor array 66 of the detector 64. The depicted method 180 then ends.

Figure 12:
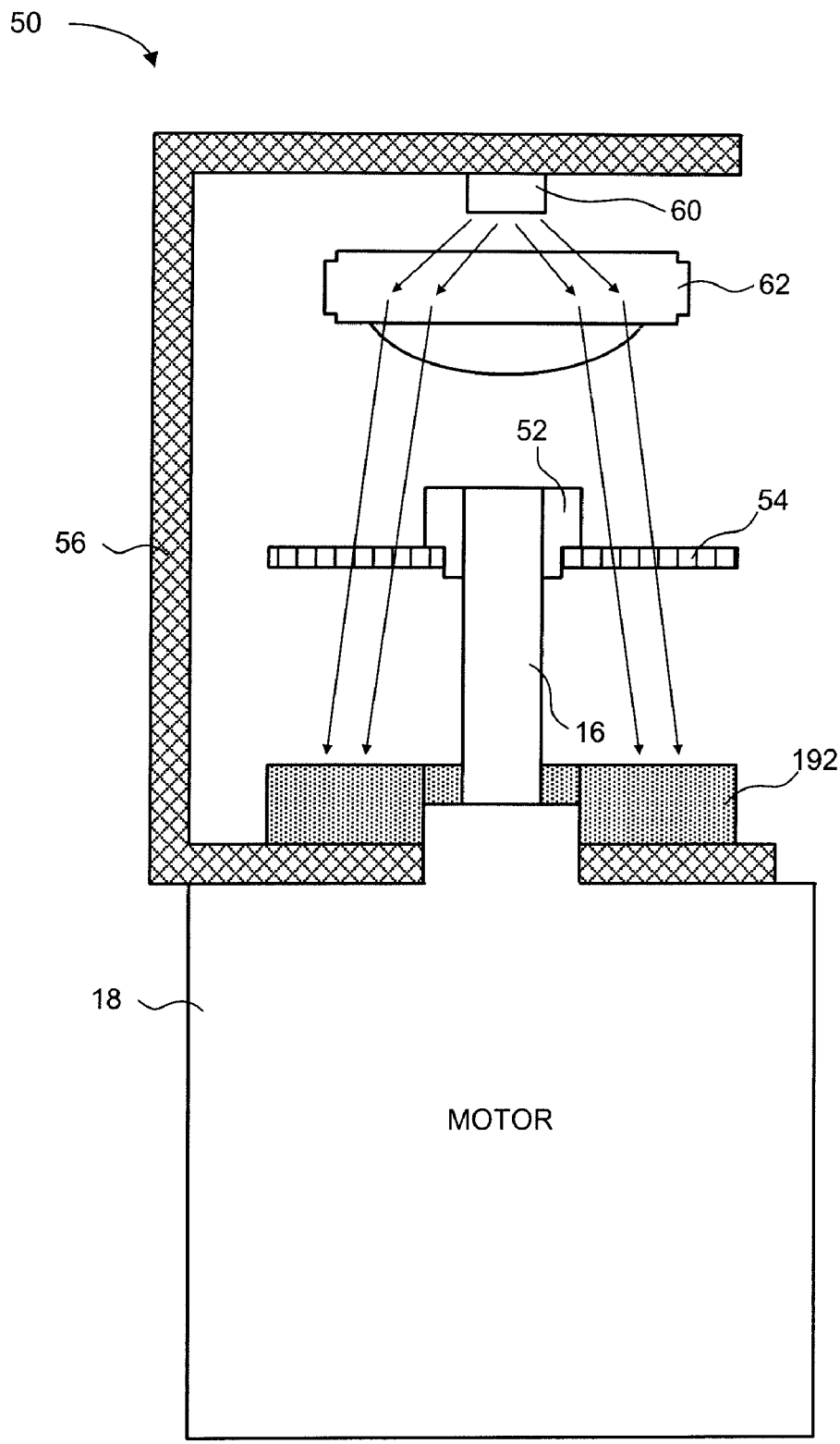
FIG. 12 depicts a schematic block diagram of another embodiment of the transmissive optical encoding system of FIG. 2.

FIG. 12 depicts a schematic block diagram of another embodiment of the transmissive optical encoding system 50 of FIG. 2. In contrast to the transmissive optical encoding system 50 of FIG. 2, the illustrated transmissive optical encoding system 50 shown in FIG. 12 includes an integrated circuit (IC) 192 with an integrated photosensor array. In this way, the photosensor array is integrated into one chip 192 with the circuitry. Accordingly, the bare chip 192 can be die attached and wire bonded onto the flexible cable 56 (or another substrate). In one embodiment, the chip 192 has an axial through hole in order to be mounted on the motor shaft 16. In some implementations, this embodiment takes up a relatively small area of silicon, so it is feasible to mount the transmissive optical encoding system 50 on a small motor 18. Additionally, similar to the detector 64 described above, the chip 192 may be square, square with chamfered corners, round, or another shape conducive to mounting on a particular motor 18. Other embodiments may use other packaging such as chip scale packaging (CSP), quad flat no-lead (QFN), or another type of transparent package. In all embodiments, the packages include an axial though hole in order to mount the transmissive optical encoder 50 on the motor shaft 16.

It should be noted that various forms of the optical encoder described herein may be implemented in several types of applications. For example, some embodiments of the optical encoder may implement an incremental encoder for two or three channels, or another number of channels. Other embodiments of the optical encoder may implement a commutation encoder with six channels, or another number of channels. Other embodiments of the optical encoder may implement a pseudo absolute encoder. Other embodiments of the optical encoder may implement an absolute encoder. Other embodiments of the optical encoder may implement other types of encoders.

Additionally, the various embodiments of the optical encoder may present one or more benefits. For example, some embodiments facilitate the implementation of a relatively small form factor to fit small rotary systems. Miniaturization may be further applicable with the advancement of smaller transistor sizes in semiconductors. As another example, some embodiments enable a transmissive system for high frequency applications, without sacrificing the overall size of the transmissive optical encoder. As another example, some embodiments reduce or eliminate positional errors resulting from eccentricity. As another example, some embodiments enable simplicity in top-down assembly of a transmissive optical encoder. Other embodiments may provide other uses and benefits.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A transmissive optical encoder, the transmissive optical encoder comprising:
   a detector with an aperture through the detector, the aperture to receive a rotary shaft of a motor;
   a code wheel coupled to the rotary shaft of the motor, wherein rotation of the rotary shaft results in corresponding rotation of the code wheel; and
   an emitter to emit a light signal through the code wheel toward the detector, wherein rotation of the code wheel results in modulation of the light signal at the detector.

2. The transmissive optical encoder of claim 1, further comprising a flexible circuit to which the detector and the emitter are mounted.

3. The transmissive optical encoder of claim 1, further comprising a lens to collimate the light from the emitter toward the code wheel.

4. The transmissive optical encoder of claim 1, wherein the detector comprises a substantially rectangular package.

5. The transmissive optical encoder of claim 4, wherein the substantially rectangular package comprises a chamfered corner.

6. The transmissive optical encoder of claim 1, wherein the detector comprises a substantially cylindrical package.

7. The transmissive optical encoder of claim 1, wherein the aperture of the detector is approximately centered on a surface of the package.

8. The transmissive optical encoder of claim 1, wherein the aperture of the detector is off-center on a surface of the package.

9. The transmissive optical encoder of claim 1, wherein the detector comprises at least one of:
   integrated circuit dice with wire bonding and encapsulation to protect the wire bonds;
   a flip chip with underfill to protect a ball bond; or
   a chip-scale-package.

10. The transmissive optical encoder of claim 1, wherein the transmissive optical encoder comprises at least one of:
    an incremental encoder for multiple channels;
    a commutation encoder with multiple channels;
    a pseudo-absolute encoder; or
    an absolute encoder.

11. A method for assembling a transmissive optical encoder system, the method comprising:

mounting a detector comprising a photosensor array on a rotary shaft of a motor, with the rotary motor shaft projecting through an aperture in the detector;

mounting a coding element to the rotary shaft to modulate a light signal upon rotation of the rotary shaft; and mounting an emitter relative to the coding element to generate the light signal and to direct the light signal toward the coding element, wherein the detector is located to detect the modulated light signal.

12. The method of claim 11, further comprising mounting the detector to a flexible circuit.

13. The method of claim 11, further comprising mounting a housing to the motor, wherein the housing is configured to receive and retain the emitter in a location to direct the light signal toward the coding element and the detector.

* * * * *